UNITED STATES PATENT OFFICE.

WILLIAM A. HALL, OF BELLOWS FALLS, VERMONT.

CASEIN GLUE.

SPECIFICATION forming part of Letters Patent No. 684,545, dated October 15, 1901.

Application filed February 26, 1901. Serial No. 48,958. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Casein Glue, of which the following is a specification.

This invention or discovery has for its object to provide a penetrating and strong waterproof casein glue. The adhesive properties of casein have long been known, and in recent years it has come much into use as a substitute for glue, but principally as a sizing-glue and not usually as designed for joining. The reason for this is that casein glues as heretofore made were not sufficiently penetrative and did not strike into the bodies which it was desired to stick together, these glues being more of the nature of sizings, lying largely on the surfaces, and but little success was made with them as joining-glues until I discovered that by dissolving the casein with ammonia and adding an excess of that solvent the casein glue could be made to penetrate. Since then this glue has come into considerable use; but there are some objections to it, the principal one being that it is difficult to obtain a thoroughly waterproof joint, though it is more resisting to moisture than animal glues. Another objection to the ammonia casein glue is the excessive fumes of the solvent, which makes it disagreeable for the workmen.

There has long been a great demand for a thoroughly waterproof penetrating glue for use in the manufacture of veneers and for joining wood exposed to water and dampness; but no practically successful article of this kind has been obtained and none is upon the market. I have now discovered a way of making such an article, which is described in the following specification.

In making a waterproof glue with casein it has sometimes been customary to use slaked lime as a solvent and also as a waterproofing agent, the lime first dissolving the casein and then causing the casein glue to become insoluble when dried out by the peculiar and well-known action of the lime upon the casein; but such solutions do not penetrate the wood to any considerable extent, and joints made with it are brittle and weak, and although they are quite moisture-resisting they do not have sufficient initial strength of their own. Furthermore, casein dissolved with lime makes a very unstable solution, one which thickens rapidly and can be used only when immediately made, becoming unworkable after a few hours, and such glue has never come largely into commercial use.

I have now discovered that by a combination of phosphate and sulfite of soda casein can be dissolved, although, so far as has thus far been demonstrated, neither of these salts will dissolve it perfectly alone without using a very large percentage; but when brought together they act as a solvent by using a comparatively small percentage. This solution does not, however, become waterproof, except by the addition of lime, (calcium hydrate,) yet when the lime is added to the casein treated with the above-mentioned salts a stable and penetrating solution is obtained, one that does not thicken up and which will remain in workable condition for a considerable length of time. The proportions of these ingredients, by weight, which I find best adapted for the purpose stated are as follows: dry casein, fifty to sixty parts; phosphate of soda, about twenty parts; sulfite of soda, about ten parts, and dry lime, either slaked or unslaked, twenty to thirty parts, these proportions being, however, capable of some variation.

The casein-glue composition consisting of the above-mentioned ingredients will dissolve in hot or cold water about the same as ordinary animal glue. It makes an extremely strong joint and one which is practically water-resisting. Veneers made with it can be soaked in water for a long time without any separation or warping and can even be boiled in water and then dried out by a gentle heat without any separation. Owing to these characteristics my improved casein glue is of great value for many purposes, as it renders it possible to use veneer made with this glue in the construction of boats and other articles that are continually exposed to water and dampness, where veneers could not be used before.

For making my improved casein glue I prefer to use casein which has been precipitated by rennet; but I do not, however, wish to limit myself to the use of rennet-precipitated casein in making my improved glue, as it is possible that other precipitants than rennet in preparing the casein might be employed.

Having thus described my invention or discovery, I claim and desire to secure by Letters Patent—

A glue composition consisting of casein, phosphate of soda, sulfite of soda, and lime, in about the proportions stated.

In testimony whereof I affix my signature in presence of two witnesses.

WILLIAM A. HALL.

Witnesses:
 HENRY DUNHAM,
 P. J. WURTS.